Jan. 13, 1970    R. BEAUPERE    3,489,039
AUTOMATIC INDEXING PLATE
Filed Feb. 15, 1968    2 Sheets-Sheet 1

ROGER BEAUPERE, INVENTOR

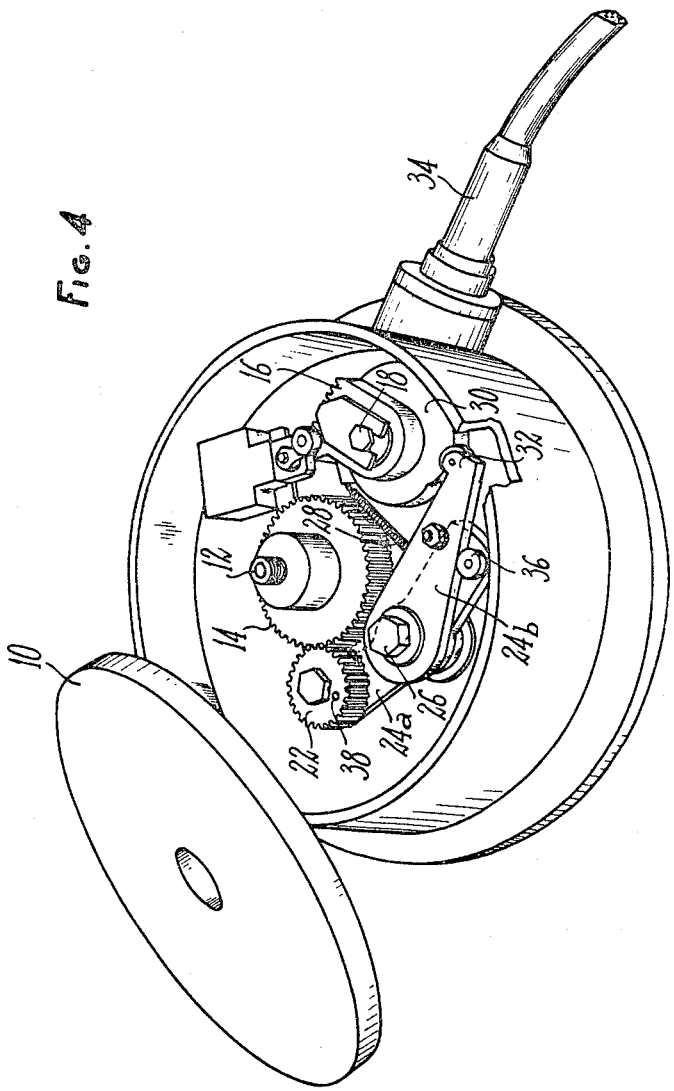

United States Patent Office 3,489,039
Patented Jan. 13, 1970

3,489,039
AUTOMATIC INDEXING PLATE
Roger Beaupere, 10 Rue Edouard Henriot,
Champs sur Marne 77, France
Filed Feb. 15, 1968, Ser. No. 705,788
Claims priority, application France, Mar. 1, 1967,
96,960
Int. Cl. B23b 29/32
U.S. Cl. 74—815                                    6 Claims

ABSTRACT OF THE DISCLOSURE

An automatic-cycle indexing plate mechanism in which the indexing plate is mounted on a shaft carrying a pinion adapted to be drivingly engaged by a toothed quadrant carried by another, continuously-rotating shaft on which a cam is provided, said cam being engaged by a follower carried in turn by a spring-urged pivoting arm supporting a locking pinion adapted to engage said first-named pinion so as to lock same during the time periods in which said quadrant is not in meshing engagement with said first-named pinion.

---

This invention relates to a simplified automatic indexing plate controlled by means of a mechanical gear arrangement, and is concerned more particularly with means for rotatably driving step-by-step a plate for example with a view to bring one or more workpieces to different successive working stations.

A rotary index plate according to this invention, divided into a plurality of stations, is rotatably driven step-by-step from a member revolving continuously and characterised in that it comprises a pinion rotatably rigid with the plate shaft and driven for stepwise rotation from a toothed quadrant driven in turn for continuous rotation, the number of teeth of said toothed quadrant, their shape and the pitch diameters of said toothed quadrant and said plate pinion being so calculated that during each revolution of said quadrant the latter meshes with said plate pinion to drive same along a circular arc corresponding to the angular distance between two successive working stations associated with said indexing plate; a pinion or a toothed rack fixedly mounted on a spring-urged arm adapted to oscillate about a fixed pivot pin, said pinion or rack being adapted to mesh with said plate pinion during the working periods; a cam rotatably rigid with said toothed quadrant and a follower rigid with said arm and adapted to be actuated by said cam for moving said arm and therefore its pinion or rack away from said plate pinion to permit the driving of said plate from said toothed quadrant during preselected time periods.

According to a specific feature of this invention, the pinion or rack carried by said arm and intended for locking the plate during a working period is adapted, before being definitely fastened in the position corresponding to a working cycle, to rotate about its axis in order to facilitate the pre-adjustment of the locking position.

According to another feature characterising this invention, the arm carrying said plate-locking pinion or rack consists of two parts assembled and mounted on a common pivot pin, the free end of one part carrying said pinion or rack and the free end of the other part said follower, means being provided to permit the adjustment of the relative angular position of these two parts.

Other features and advantages of this invention will appear as the following description proceeds with reference to the accompanying drawings illustrating diagrammatically by way of example typical forms of embodiment thereof, it being understood that these forms of embodiment should not be construed as limiting the present invention since many modifications and variations may be brought thereto without departing from the spirit and scope of the invention as set forth in the appended claims. In the drawings:

FIGURE 4 is a detail view showing in perspective another form of embodiment of the device illustrated in FIGURE 1.

Figure 1:
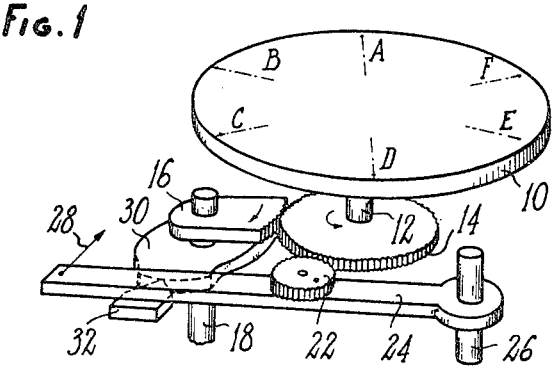
FIGURE 1 is a diagrammatic isometric perspective view of the driving and locking device of this invention, as applied to an indexing plate.

Referring first to FIGURE 1 it will be seen that an indexing plate 10 comprising in this exemplary form of embodiment a plurality of working stations A, B, C, D, E and F disposed at spaced intervals along the outer periphery of the plate, is rotatably rigid with a rotary shaft 12 carrying a toothed pinion 14 also rotatably rigid therewith. This pinion 14 is adapted to be brought in meshing engagement with a toothed quadrant 16 rotatably rigid with another shaft 18 parallel to shaft 12 and driven from any suitable power source in order to produce the step-by-step rotation of the indexing plate 10 for switching same from one working station to another adjacent working station.

The driving toothed quadrant 16 revolves constantly in the same direction during the positioning or indexing of plate 10. When the change from one working station to the next one is to take place, the tip of the first tooth of quadrant 16 engages the tip of one of the teeth of pinion 14, before the point of tangency of the two pitch circles of pinion 14 and quadrant 16, and then all the teeth of quadrant 16 mesh with those of pinion 14. Eventually, the tip of the last tooth of quadrant 16 is disengaged from pinion 14, beyond the point of tangency of the two pitch circles of quadrant 16 and pinion 14. At the end of this cycle the relative angular positioning of pinion 14, and therefore the indexing of plate 10 took place according to a value depending on:

(a) The pitch diameter of each toothed member 16 and 14;
(b) The number of operative teeth of quadrant 16;
(c) The tooth shape;
(d) The distance between centers of shafts 12 and 18.

In order to wedge or lock in position the indexing plate 10 during the work (i.e. while pinion 14 is not in meshing engagement with quadrant 16) there is provided according to a specific feature of this invention a pinion or toothed rack 22 secured to a movable arm 24 and adapted, during said working period, to remain in meshing engagement with the plate pinion 14. This pinion or rack 22 is also useful for correcting minor indexing errors of pinion 14 and to facilitate the re-engagement between quadrant 16 and pinion 14.

The arm 24 carrying the locking pinion or rack 22 is adapted to oscillate about a pivot pin 26 which, in this specific form of embodiment, is disposed at one end of the arm 24 of which the opposite end is urged by a tension spring 28 or the like, or by an actuator responsive to another cam (not shown) carried by shaft 18, towards the plate shaft 12.

The arm 24 is adapted to pivot about the pin 26 for disengaging the locking pinion or rack 22 from the plate pinion 14 when the latter is rotated step-by-step by the driving quadrant 16. The movement of rotation is obtained by means of a cam 30 rigid with shaft 18 supporting the toothed quadrant 16 and adapted to move a locking follower 32 carried by said arm 24; in this case the pinion 14 can revolve freely and thus be driven from the toothed quadrant 16.

It will be readily understood that the above-described device is suitable for actually displacing with precision the index plate 10 with a step-by-step rotational movement to bring the position or stations A, B, C, D, E and F of this example in front of the corresponding successive working stations, the plate being locked against movement during the work.

According to this invention the shaft 18 may also be used for moving the working tools to and from their operative positions, either by means of cams secured to this shaft 18 or with the assistance of adjustable dogs or the like secured to a disk and adapted to actuate switch means or the like.

The work-piece or workpieces are disposed on the plate 10 at one or more predetermined positions.

It will be noted that the desired accurate division may not always result from the passage of the control or driving toothed quadrant. As already explained hereinabove, a slight angular shifting will then be taken up by causing the engagement of the locking pinion with the plate pinion. The slight shifting thus taken up affords a perfect, accurate re-engagement of the teeth of quadrant 16 and pinion 14 during the next passage of the quadrant 16.

According to a modified form of embodiment of the present invention the driving shaft 18 may have an extension driven in turn from one or more shafts providing a predetermined ratio with a view to properly synchronize or time different operative motions by means of cams, followers and/or switches. Other followers or switches disposed on the surface of shaft 12 and along the paths of the operative movements (such as machining units or else) may be provided.

It is also possible to stop, slow-down, or accelerate the driving shaft 18, and/or reverse its direction of rotation, at any moment, according to the specific results contemplated.

Thus, for example, a plate, lever or tool-supporting turret (revolver turret) may be secured to the shaft 12. Certain known machining operations may be carried out during the indexing movement or when the plate is locked against motion; in other cases it may be advantageous, according to a specific feature of this invention, to provide means for braking the plate shaft 12 and prevent same from racing.

FIGURE 4 illustrates in detail a device according to this invention which is substantially similar to the form of embodiment shown in FIGURE 1. It comprises likewise a plate 10 (shown before securing same to the shaft 12, in order to afford a clearer view of the driving mechanism thereof), the driven pinion 14, the toothed quadrant 16 having its shaft 18 rotatably driven in this case through the medium of a flexible cable 34.

In this example the arm 24 comprises two portions, respectively 24a and 24b. The free end of shaft portion 24a carries the locking pinion 22 and the free end of shaft portion 24b carries the cam follower 32. These shaft portions 24a and 24b are pivotally mounted on a common pivot pin 26. According to the present invention, means are provided for modifying and adjusting at will the relative angular position of the two arm portions 24a and 24b.

These means consist in this example of an eccentric 36 mounted on shaft portion 24a against one of the edges of the other portion 24b. The rotation and eventually the locking of this eccentric permits of positioning the two arm portions in the desired relative angular position. This specific arrangement is extremely advantageous in that it permits of easily taking up any play either during the primary or initial adjustment or in case or wear.

Moreover, in this specific arrangement the locking pinion 22 may be positioned before definitely securing same to the end of the corresponding arm portion 24a in order to provide a pre-adjustment without producing any change in the lever arm ratio. A pin 38 will lock the pinion 22 in the desired position on the corresponding arm portion 24a.

Figure 2:
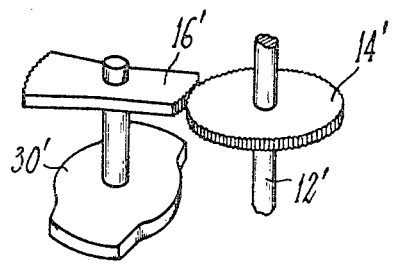
FIGURE 2 is a detail view showing in perspective a modified construction of the driving device.

In the modified form of embodiment illustrated in FIGURE 2 of the drawing the device provides two asymmetric passes of the indexing plate, the toothed quadrant 16' comprising to this end two operative sectors of different angular amplitudes and the cam 30' has two control contours.

Figure 3:
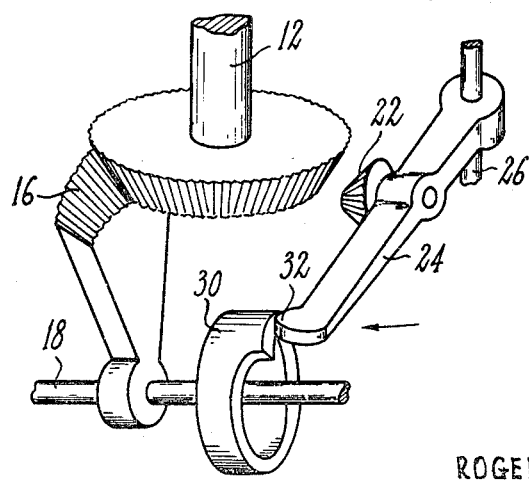
FIGURE 3 is another perspective view showing a modified form of embodiment of the driving and locking system according to this invention, which utilizes bevel gears.

In the modified construction illustrated in FIGURE 3 the device of this invention comprise bevel gears instead of spur gears. The same reference numerals denote in this figure the corresponding members illustrated in FIGURE 1.

In comparison with other known systems (Geneva wheel, rack-and-pinion, ratchet wheel, etc.) the arrangement of this invention is characterised by the following advantageous features:

A simplified construction and manufacture;
A simplified final adjustment;
The cycle takes place at a uniform speed;
Any play is taken up automatically during the division or indexing;
A greater efficiency and power capacity (more than one tooth of the locking device in positive engagement);
A greater accuracy (the indexing is determined with precision);
The possibility of performing a plurality of unequal angular movements at constant speed or at different speeds along the 360 degrees;
A pre-adjustment without producing any change in the ratio of the arm portion, by simpling rotating the locking pinion about its axis before definitely locking same in position;
Easy take-up of primary adjustment play or in case of wear;
A positive locking action;
The possibility of using bevel gears instead of spur gears on driven shafts 12 and driving shaft 18 (FIGURE 3).

As already specified, various changes may be brought to these different forms of embodiment without departing from the spirit and scope of the invention as set forth in the appended claims.

What is claimed is:
1. An automatic-cycle indexing plate mechanism comprising an indexing plate, a first shaft rotatably rigid with said indexing plate, a pinion also rotatably rigid with said first shaft, disposed beneath said indexing plate, another shaft parallel to said first shaft and having a toothed quadrant rigidly secured thereto which is adapted to mesh with said pinion for intermittently rotating said pinion and therefore said first shaft and said indexing plate when a continuous rotary motion is imparted to said other shaft, a cam rigid with said other shaft, a follower adapted to engage said cam, which is carried by the free end of an arm having its opposite end pivotally mounted to permit the oscillation of said arm towards and away from said cam, resilient means constantly urging said arm towards said cam, a locking pinion fixedly mounted on said arm intermediate its ends and adapted to engage the teeth of the pinion carried by said first shaft during that portion of the revolution of said quadrant in which said quadrant is not in meshing engagement with the pinion of said first shaft, the number of teeth of said quadrant, their shape and the pitch diameters of said quadrant and first shaft pinion being so calculated that during each revolution of said toothed quadrant said toothed quadrant meshes with said first shaft pinion to drive same along a circular arc corresponding to the angular distance between two successive working stations with which said indexing plate is associated.

2. An automatic-cycle indexing plate mechanism as set forth in claim 1, wherein said locking pinion mounted on said arm and adapted to lock said first-shaft pinion and therefore said indexing plate during the inoperative portion of the quadrant revolution is adapted before it is definitely secured to said arm, to rotate about its axis for permitting a pre-adjustment of the plate locking position.

3. An automatic-cycle indexing plate mechanism as set forth in claim 1, wherein said first-shaft pinion, toothed quadrant and locking pinion consist of bevel gear elements.

4. An automatic-cycle indexing plate mechanism as set forth in claim 1, wherein said toothed quadrant comprises two toothed sectors having different angular amplitudes to provide corresponding different idle periods of said indexing plate.

5. An automatic-cycle indexing plate mechanism as set forth in claim 1, wherein said arm is divided into two portions, the free end of one portion supporting said locking pinion and the free end of the other portion receiving said follower, said arm portions being rigidly and adjustably assembled and adapted to pivot about a common pin.

6. An automatic-cycle indexing plate mechanism as set forth in claim 5, wherein the means for adjusting the relative angular position of said arm portions consist of an eccentric mounted on one of said arm portions and engaging the edge of the other portion.

References Cited

UNITED STATES PATENTS

| | | |
|---|---|---|
| 1,967,689 | 7/1934 | Schaver et al. |
| 1,988,675 | 1/1935 | Tessky. |

FRED C. MATTERN, Jr., Primary Examiner

F. D. SHOEMAKER, Assistant Examiner

U.S. Cl. X.R.

74—820, 822, 827